United States Patent
Kellner (10) Patent No.: US 11,200,747 B2
(45) Date of Patent: Dec. 14, 2021

(54) INSPECTION AND CLEANUP OF PHYSICAL STRUCTURES USING AUGMENTED REALITY

(71) Applicant: Autodesk, Inc., San Rafael, CA (US)

(72) Inventor: Hans David Kellner, Oakland, CA (US)

(73) Assignee: AUTODESK, INC., San Rafael, CA (US)

(*) Notice: Subject to any disclaimer, the term of this patent is extended or adjusted under 35 U.S.C. 154(b) by 0 days.

(21) Appl. No.: 16/799,383

(22) Filed: Feb. 24, 2020

(65) Prior Publication Data
US 2021/0264670 A1    Aug. 26, 2021

(51) Int. Cl.
*G06T 19/00* (2011.01)
*G06T 7/00* (2017.01)
*G06T 3/00* (2006.01)
*G06T 1/00* (2006.01)

(52) U.S. Cl.
CPC .......... *G06T 19/006* (2013.01); *G06T 1/0014* (2013.01); *G06T 3/005* (2013.01); *G06T 7/0004* (2013.01); *G06T 2207/30116* (2013.01); *G06T 2219/2004* (2013.01)

(58) Field of Classification Search
None
See application file for complete search history.

(56) References Cited

U.S. PATENT DOCUMENTS

2017/0065352 A1* 3/2017 Razzaque ............. G06T 19/003
2018/0276882 A1* 9/2018 Harviainen ............. G06T 17/10

OTHER PUBLICATIONS

"BMW's Augmented Reality Glasses Turns Man Into Master Mechanic, Mark Wilson Sep. 4, 2009 video" found at "https://www.youtube.com/watch?v=Y5ywMb6SeGc". (Year: 2009).*
BMWs augmented reliaty glasses, Sep. 3, 2009. https://www.youtube.com/watch?v=Y5ywMb6SeGc (Year: 2009).*
Yu, H.B., et al., "System Designs for Augmented Reality Based Ablation Probe Tracking", Pacific-Rim Symposium on Image and Video Technology, PSIVT 2017: Image and Video Technology, pp. 87-99.

* cited by examiner

*Primary Examiner* — Yi Wang
(74) *Attorney, Agent, or Firm* — Gates & Cooper LLP (57) ABSTRACT

A method and system provide the ability to examine a three-dimensional (3D) structure. A physical 3D structure is acquired. A digital model of the 3D structure is acquired in an augmented reality (AR) system. The digital model is calibrated to match the 3D structure. The digital model is projected onto the 3D structure. A tool interacting with the 3D structure is tracked and the interaction is analyzed. A visualization of the projected digital model is updated based on the analysis.

22 Claims, 12 Drawing Sheets
(10 of 12 Drawing Sheet(s) Filed in Color)

INSPECTION AND CLEANUP OF PHYSICAL STRUCTURES USING AUGMENTED REALITY

BACKGROUND OF THE INVENTION

1. Field of the Invention

The present invention relates generally to a three-dimensional (3D) inspection and cleaning process, and in particular, to a method, apparatus, system, and article of manufacture for inspecting and cleaning a 3D structure using augmented reality (AR).

2. Description of the Related Art

Metal casting using 3D printed sand molds provides a scalable and efficient means of fabricating metal parts with complex geometric features. Molten metal is introduced into one or more cavities of a sand mold, allowed to solidify, and then the sand mold is destroyed in the process of removing the resulting metal casted part. Compulsory post-processing steps after 3D printing a mold include the removal of un-bound sand (i.e., loose/free-flowing sand). This removal is generally a manual and time-consuming process but is necessary as the un-bound sand can impact the flow of metal when the mold is filled. For simple molds, the cleaning may be easy as all of the surfaces are visible. However, in complex molds, with hidden channels and cavities, the cleaning can be time consuming and hard to verify the completeness. In this regard, when the material is poured into the mold, if the mold wasn't fully cleaned, it could lead to a part failure, and since the mold is destroyed when the part is removed, the entire process must start over to create a new part.

In addition to the above, there is a need to inspect a mold for defects/errors that may have arisen/surfaced during the printing process (e.g., extra material or the absence of material [e.g., if the printer ran out of material during the printing or manufactured an unintended pocket/additional channel]). Further, there is a need to clean/inspect any type of 3D product (e.g., piping, ducting, etc.) in an efficient manner.

Figure 1:
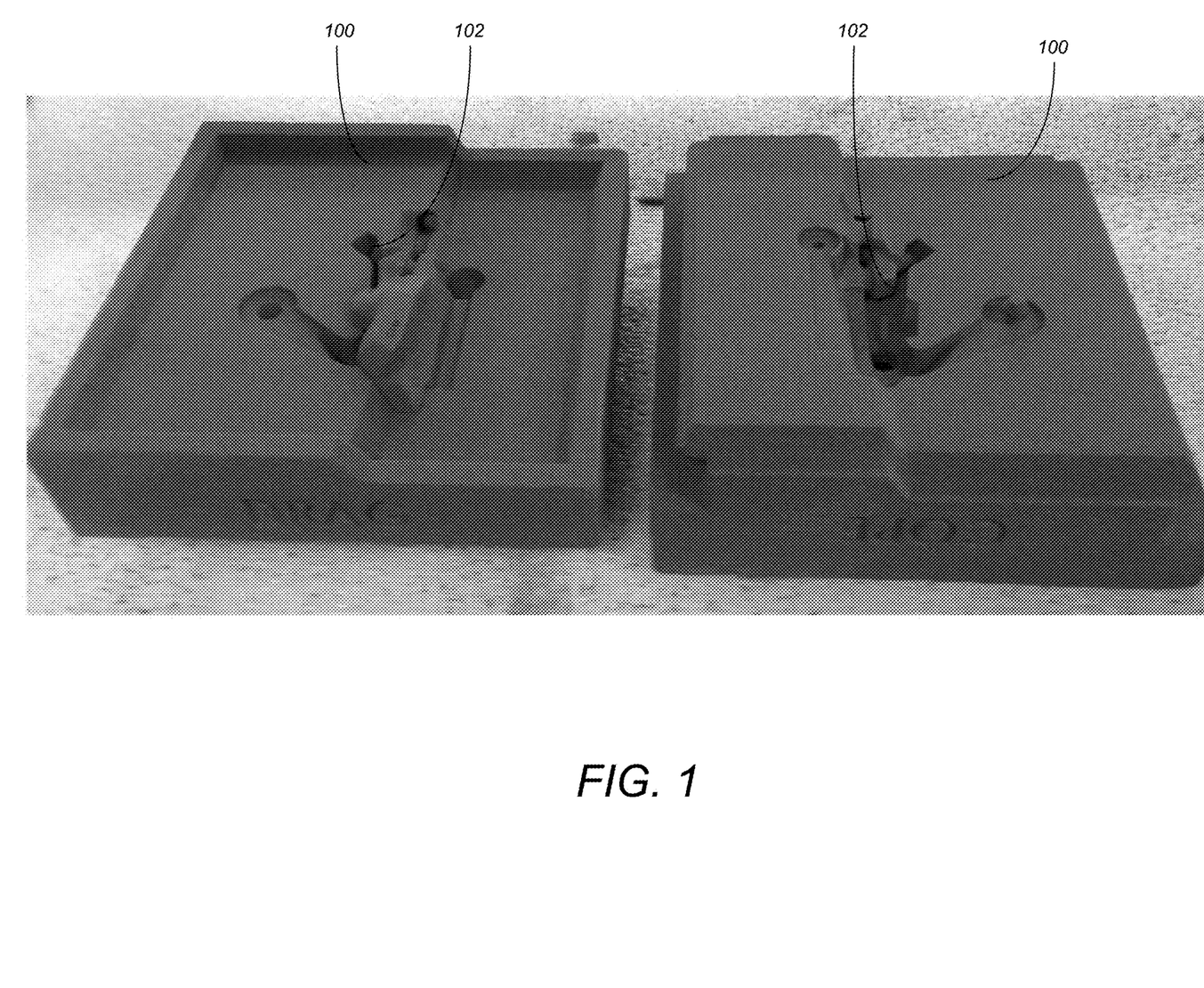
FIG. 1 illustrates an exemplary sand cast mold that has been 3D printed.
Figure 2A:
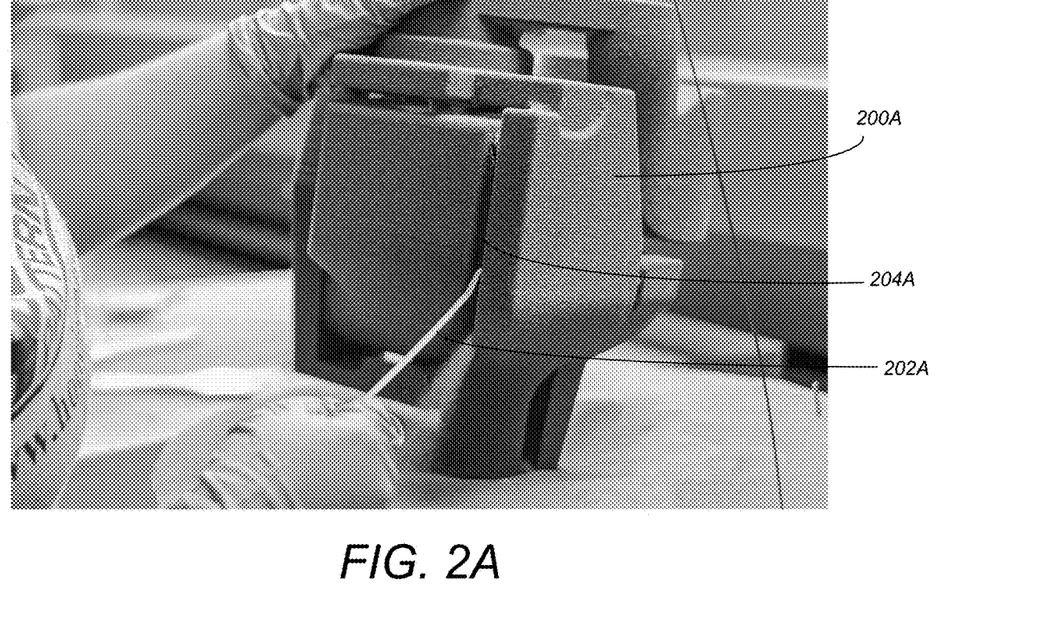
FIGS. 2A and 2B illustrate sand cast molds that are being cleaned using a cleaning tool.
Figure 2B:
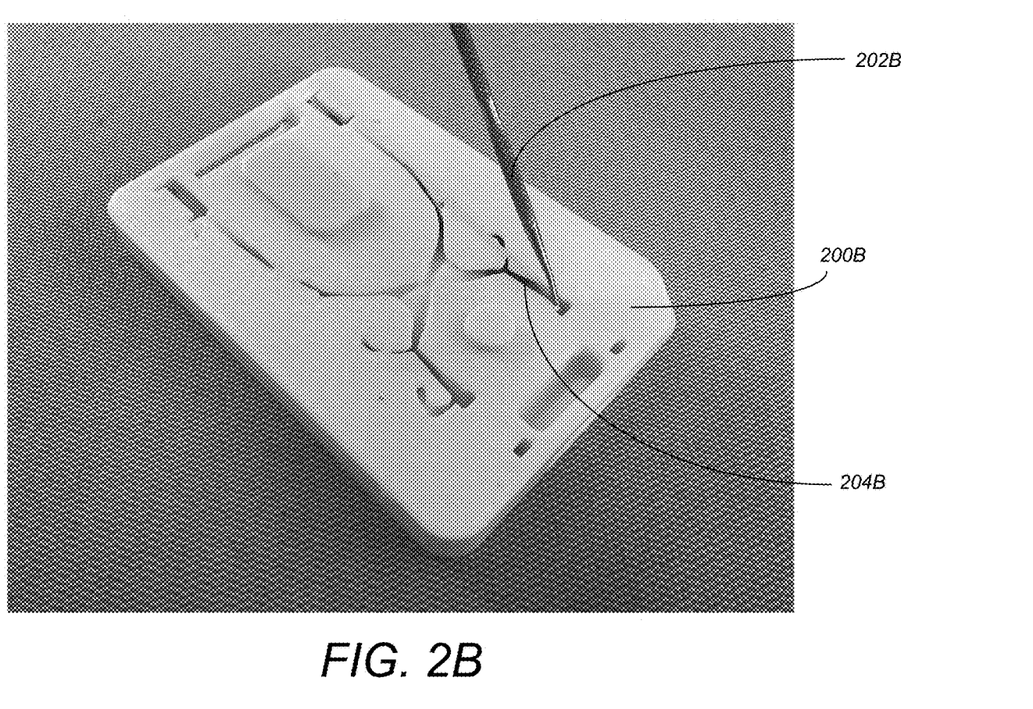
Figure 3A:
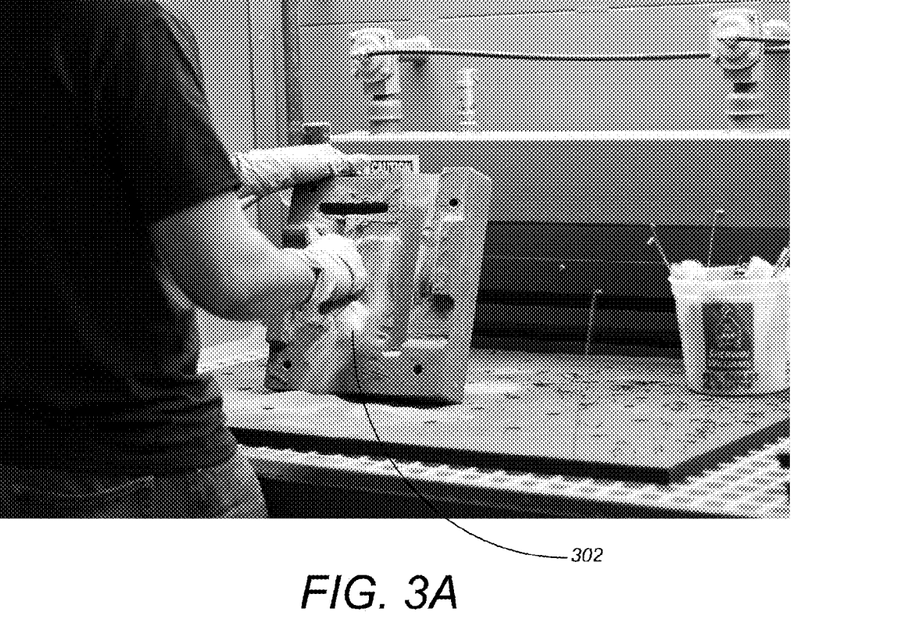
FIGS. 3A and 3B illustrate further cleaning of sand cast molds.
Figure 3B:
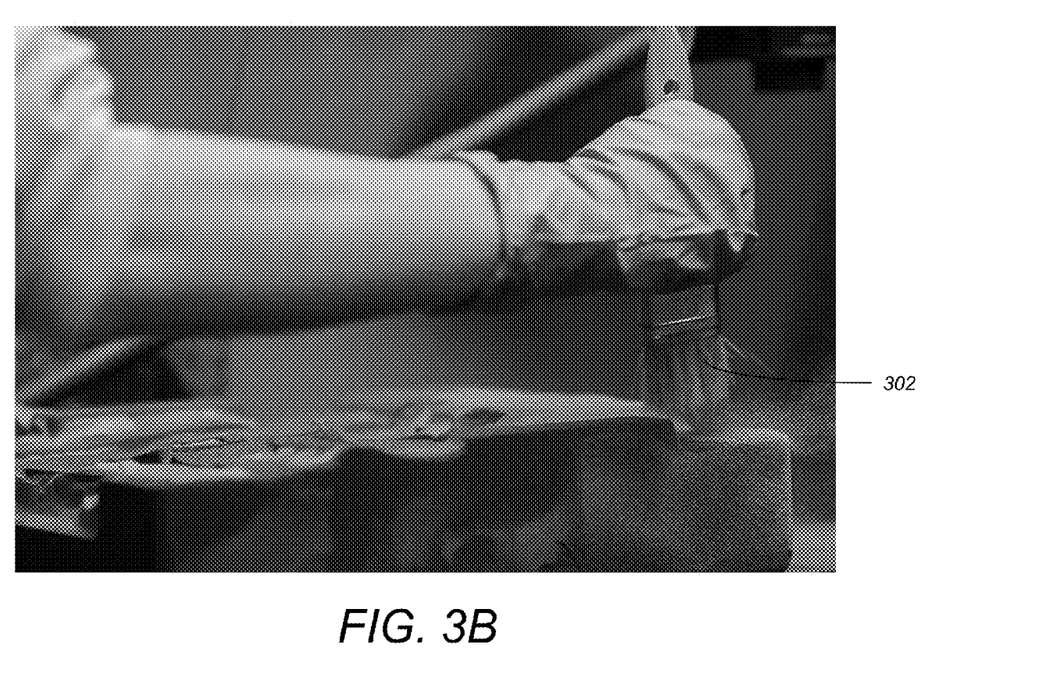

FIG. 1 illustrates an exemplary sand cast mold that has been 3D printed. As illustrated, the mold 100 contains various channels 102 that require cleaning as part of the post processing steps. FIGS. 2A and 2B illustrate sand cast molds 200A and 200B that are being cleaned using a cleaning tool 202A and 202B inserted into one of the channels 204A and 204B. FIGS. 3A and 3B illustrate further cleaning of sand cast molds (e.g., using a brush 302).

In view of the above, what is needed is a scalable and efficient means for cleaning, inspecting, and/or validating 3D structures (printed or otherwise).

SUMMARY OF THE INVENTION

Embodiments of the invention utilized augmented reality (AR) viewing to assist in the post-processing of 3D structures. Embodiments provide the ability to manipulate and track a tool within a known static form (e.g., a 3D structure such as a sand mold) along with having the exact digital model (e.g., that was used to generate the form). Such a mechanism enables a new way to provide information to a user about the 3D structure. In one or more embodiments, an AR system displays hidden channels within the 3D structure as well as where within the channels the tool has traveled.

As the 3D structure (e.g., a sand mold) is static and has a matching digital model (e.g., the model that was used to generate the sand mold), the AR system can utilize and leverage such attributes when mapping the dynamic position and orientation changes of the tool and where the tool has traveled.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Exemplary Embodiment

Sand Cast Mold

Embodiments of the invention overcome the problems of the prior art by providing an "x-ray" view into a physical structure to facilitate inspection and cleaning. The setup consists of a virtual model of a sand mold as well as the physical 3D printed mold (e.g., generated from/by the virtual model). The physical mold has one or more visible registration points that define a physical coordinate system. An augmented reality (AR) viewing application uses the registration points on the mold to align a virtual coordinate system and model with the physical mold. Therefore, a 1:1 scale virtual model may be aligned with the physical model.

Each cleaning tool has unique registration points to allow the tool's type, position, and orientation to be tracked. The AR application may then display a virtual model of the tool that is positioned and aligned to match the physical tool. This becomes useful when the physical tool is positioned such that it will be occluded by the mold. At that point, the AR application can display a virtual representation of the occluded portion of the tool.

Figure 4:
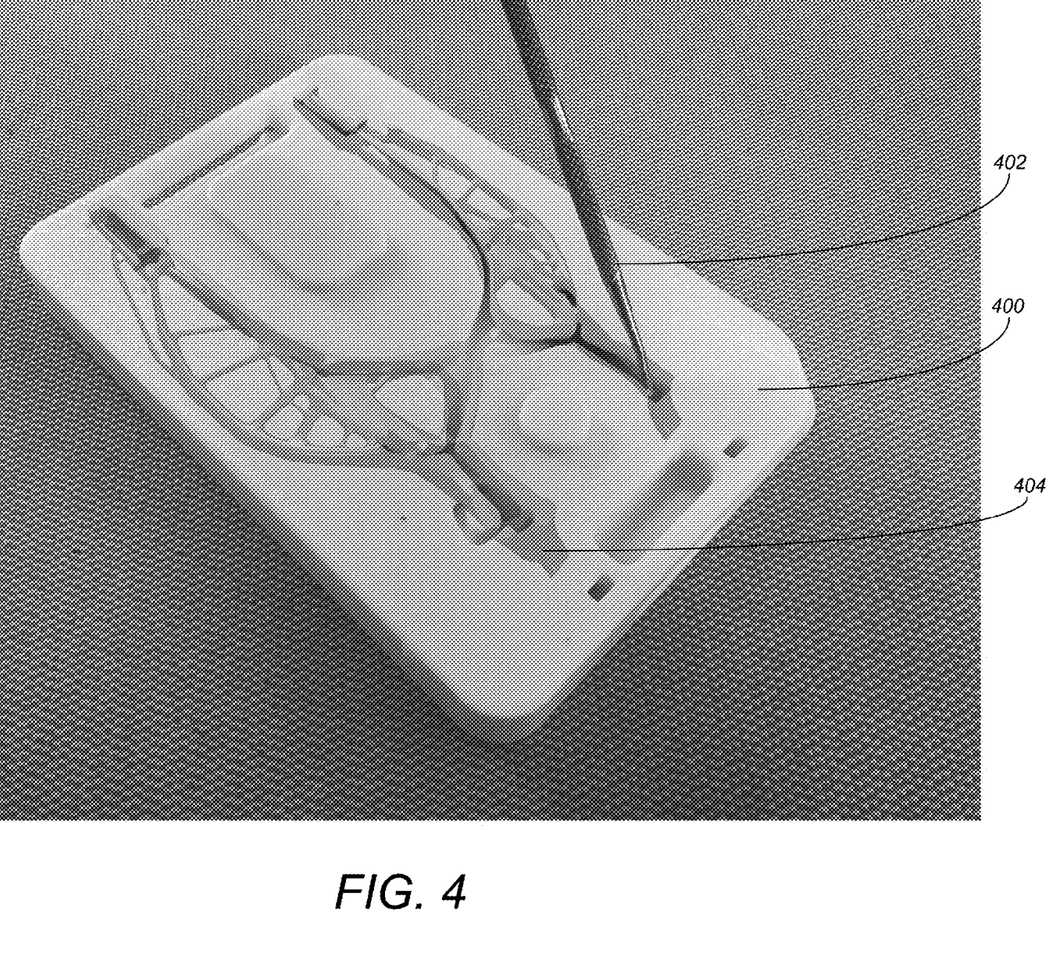
FIG. 4 illustrates a view of a user looking through a mold through an augmented reality (AR) headset in accordance with one or more embodiments of the invention.

FIG. 4 illustrates a view of a user looking through a mold 400 through an augmented reality (AR) headset in accordance with one or more embodiments of the invention. The virtual model has been aligned and scaled with the mold 400, and is tracking the tool 402. As illustrated, the areas within the mold 400 where the model will be cast is displayed in 3D. The illuminated area 404 (e.g., in a different color/hue) indicates areas that have not yet been cleaned by the tool 402. Further, in one or more embodiments, the tool's position and orientation are also being tracked and have been aligned with the mold 400.

To assist in movement of a tool 402 within hidden portions of the mold 400, hidden portions may be displayed virtually. The amount to display can be adjusted to show more or less of the mold 400. For example, only the walls of the mold 400 that are near the tool 402 may be displayed.

Figure 5:
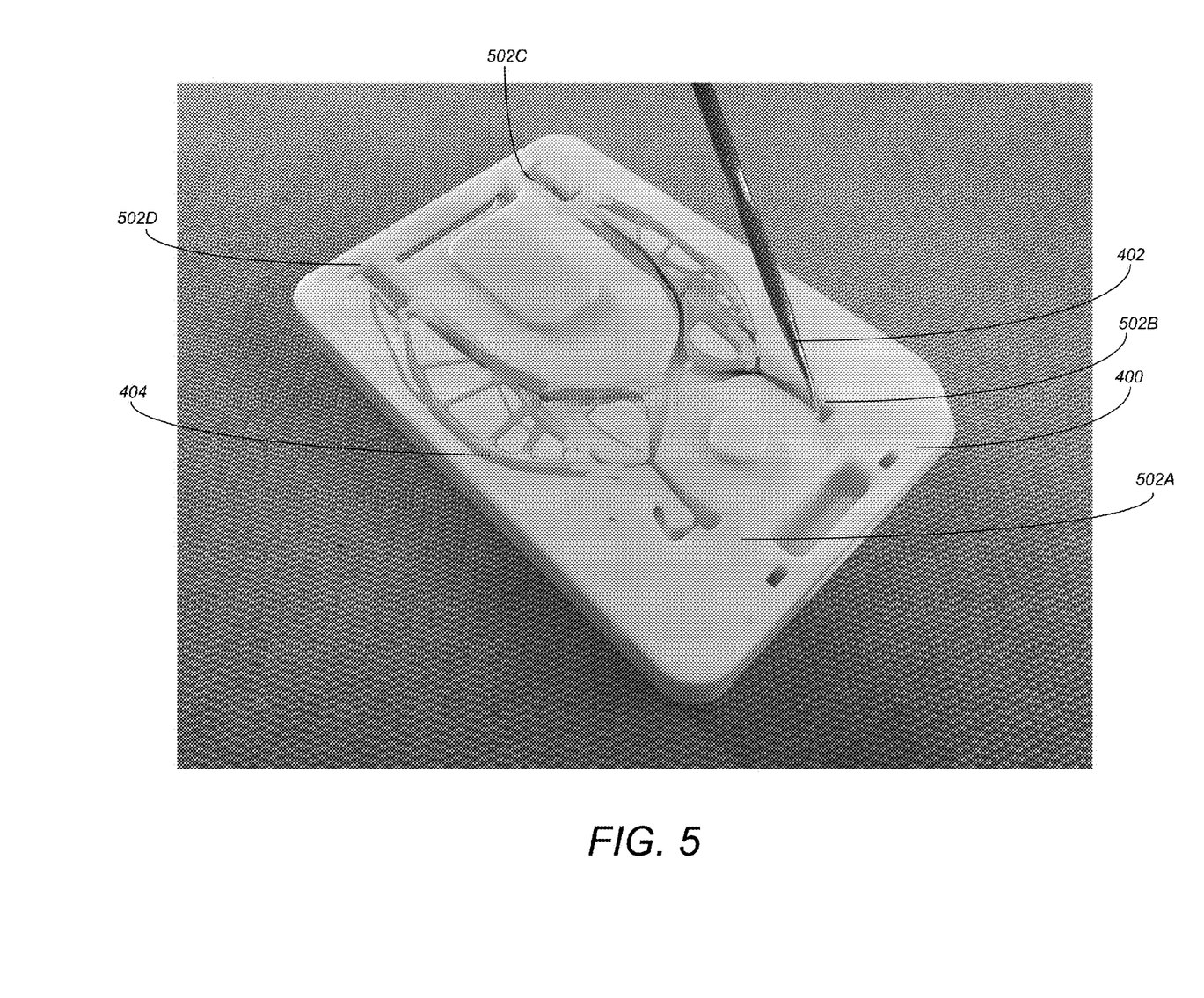
FIG. 5 illustrates a view where the user has probed and cleaned four portions of the mold and those areas are shaded/illuminated in a different color in accordance with one or more embodiments of the invention.

Finally, the path of the tool 402 can be captured and can be used to display where the operating end of the tool 402 has been within the mold 400. In essence, showing the areas where the tool has covered and thus exposing areas that have been missed. FIG. 5 illustrates a view where the user has probed and cleaned four portions 502A-502D of the mold and those areas are shaded/illuminated in a different color (e.g., green). As the user moves the tool 402 and probes within the mold 400, in real-time the tool is tracked and the areas the end of the tool 402 reaches are "painted" green. Areas 404 that still need to be cleaned may be illuminated in a different color (e.g., red).

Figure 6:
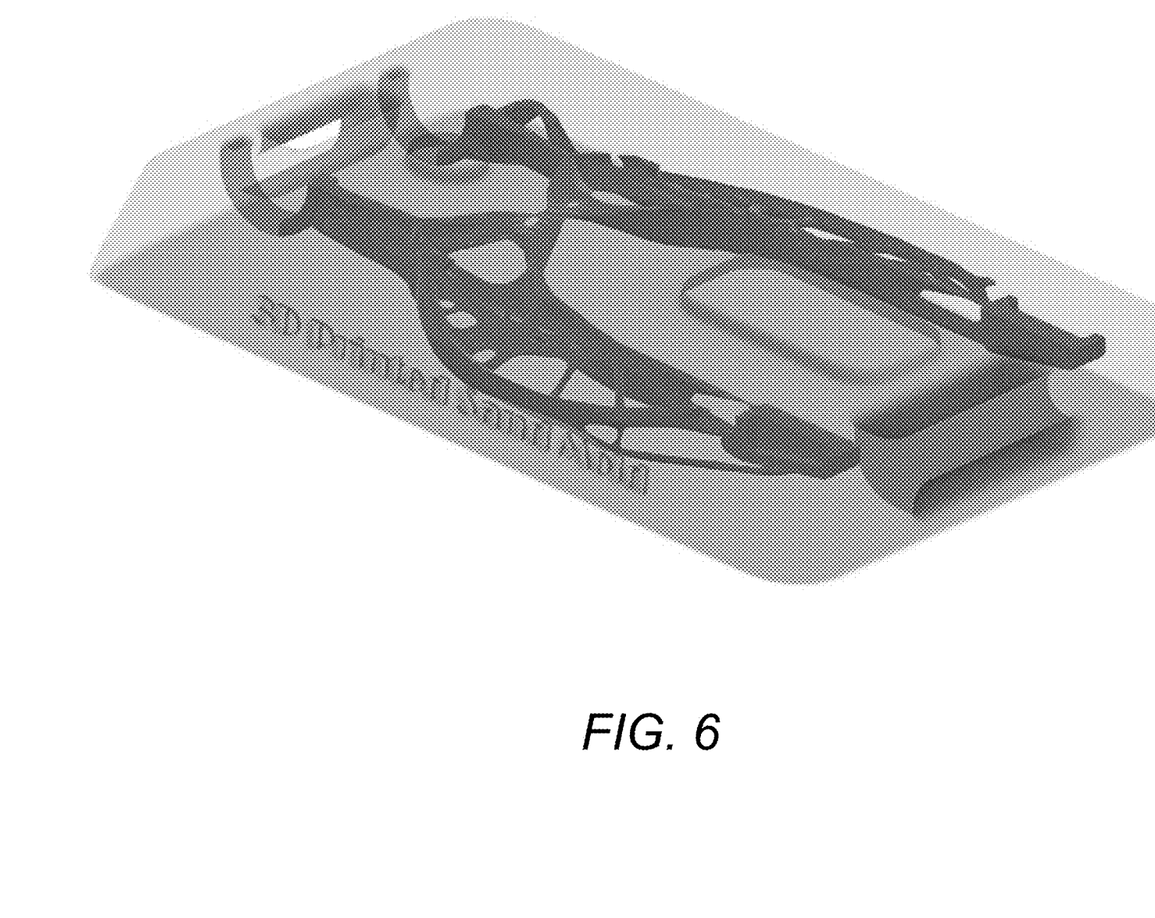
FIG. 6 illustrates a rendering showing the sand cast mold of FIGS. 4 and 5 transparent and the model within it that will be cast in accordance with one or more embodiments of the invention.

FIG. 6 illustrates a rendering showing the sand cast mold of FIGS. 4 and 5 transparent and the model within it that will be cast.

Exemplary Embodiment

Section Analysis

Figure 7:
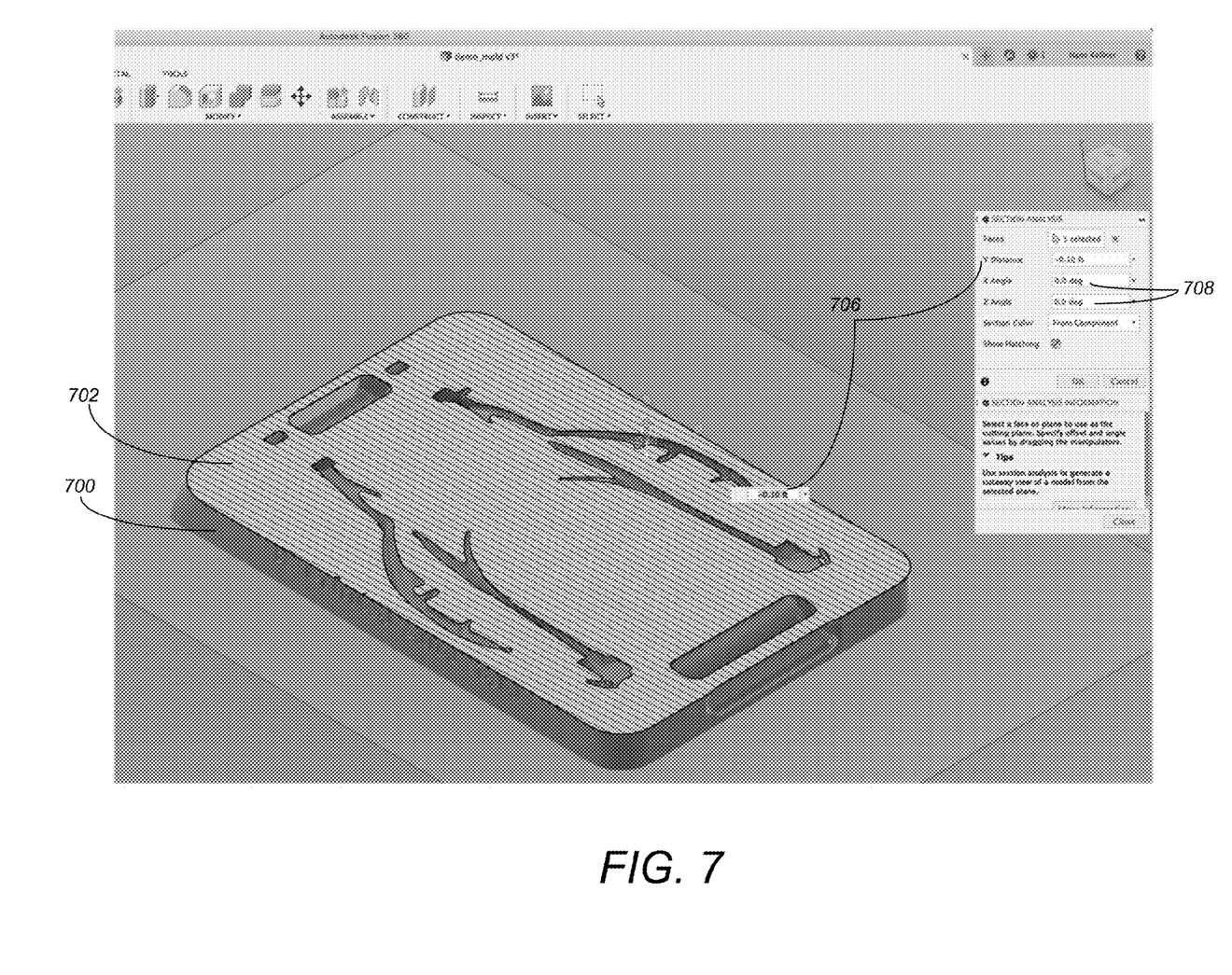
FIG. 7 illustrates a slice of a mold within a design application in accordance with one or more embodiments of the invention.

Another exemplary embodiment/use case is that of performing section analysis within a design application (e.g., the AUTODESK FUSION 360 design application). A section analysis is a mechanism to have a sliced MRI (magnetic resonance imaging) style view into a model using an AR headset. For example, a user may enable "section analysis" to better understand and view the various voids within a mold. FIG. 7 illustrates a slice of a mold within a design application in accordance with one or more embodiments of the invention. As illustrated, a face or plane be selected to use as a cutting plane 702 into the model 700. An offset 706 and angle values 708 may be specified (e.g., by dragging manipulators/grips and/or by entering values). Accordingly, a section analysis may be used to generate a cutaway view of a model from a selected plane.

Figure 8A:
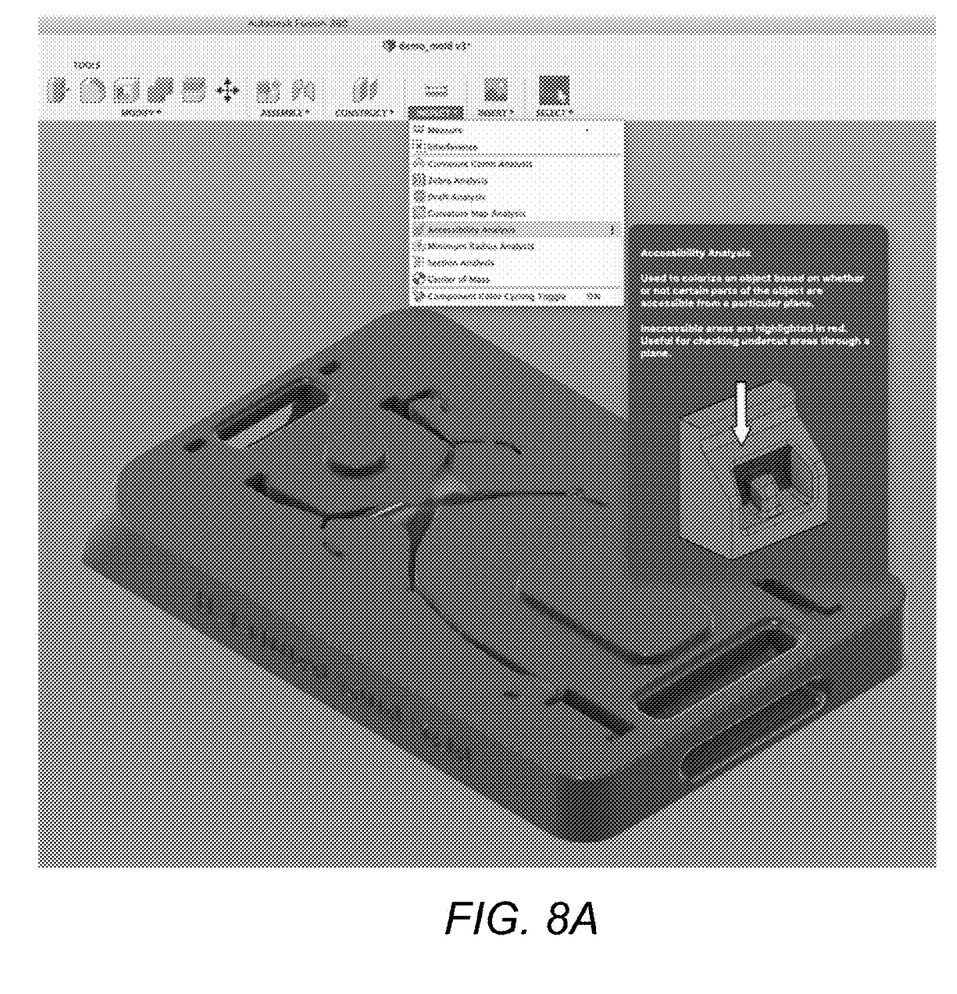
FIG. 8A illustrates the selection of an accessibility analysis feature in a design application in accordance with one or more embodiments of the invention.
Figure 8B:
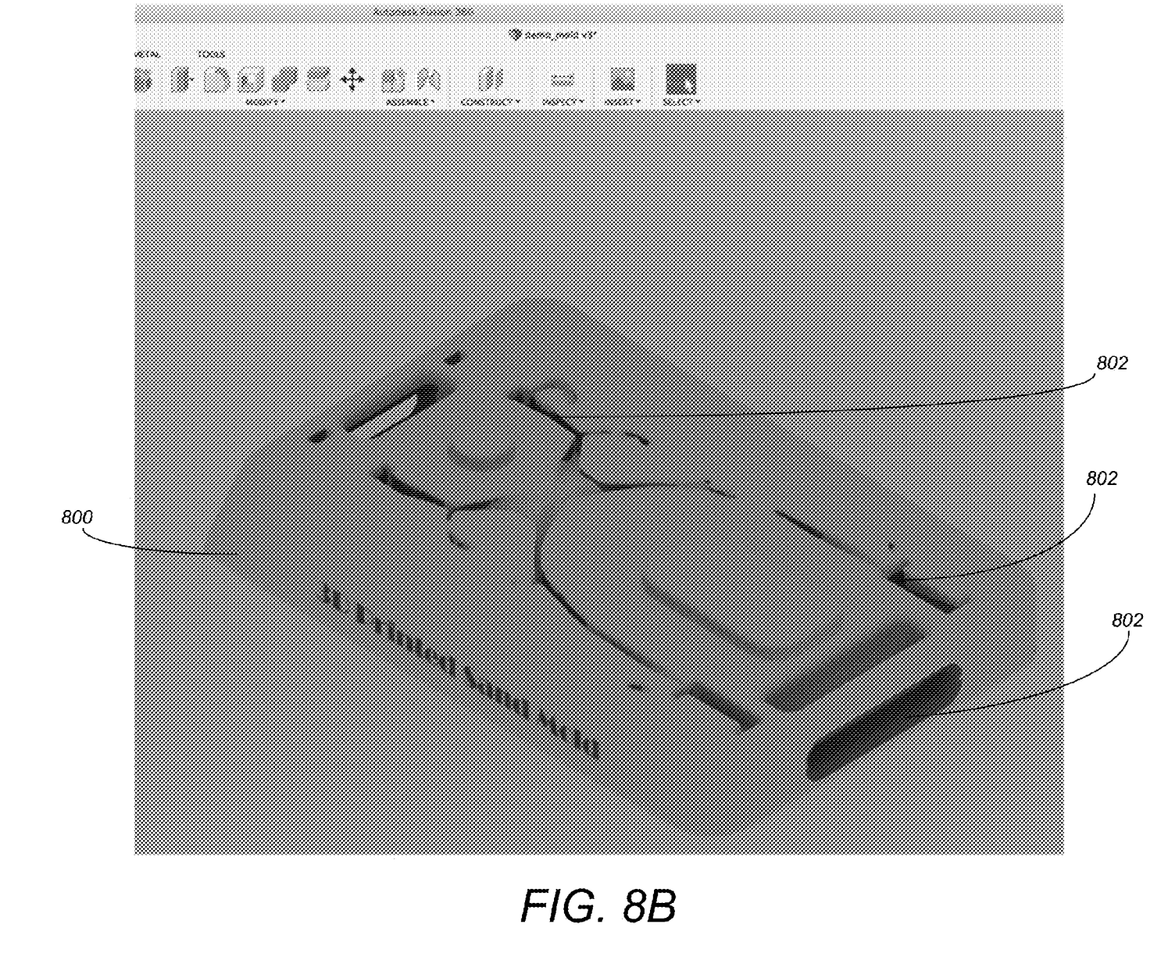
FIG. 8B illustrates the accessibility analysis applied to a mold in accordance with one or more embodiments of the invention.

Additionally, it may be possible, knowing the specific tools the user has for cleaning, to determine the voids within the mold that are physically impossible to reach. For example, an "accessibility analysis" feature may be available within a design application. Such a feature may be used to determine if a part may be cleaned by a specified tool. For example, the accessibility analysis may be used to colorize an object based on whether or not certain parts of the object are accessible from a particular plane. Inaccessible areas may be highlighted (e.g., in a different color such as red). Such a feature may be useful for checking undercut areas through a plane. FIG. 8A illustrates the selection of an accessibility analysis feature in a design application in accordance with one or more embodiments of the invention. FIG. 8B illustrates the accessibility analysis applied to a mold 800 in accordance with one or more embodiments of the invention. As illustrated, highlighted areas 802 indicate where a vertically oriented tool may not reach.

Logical Flow

Figure 9:
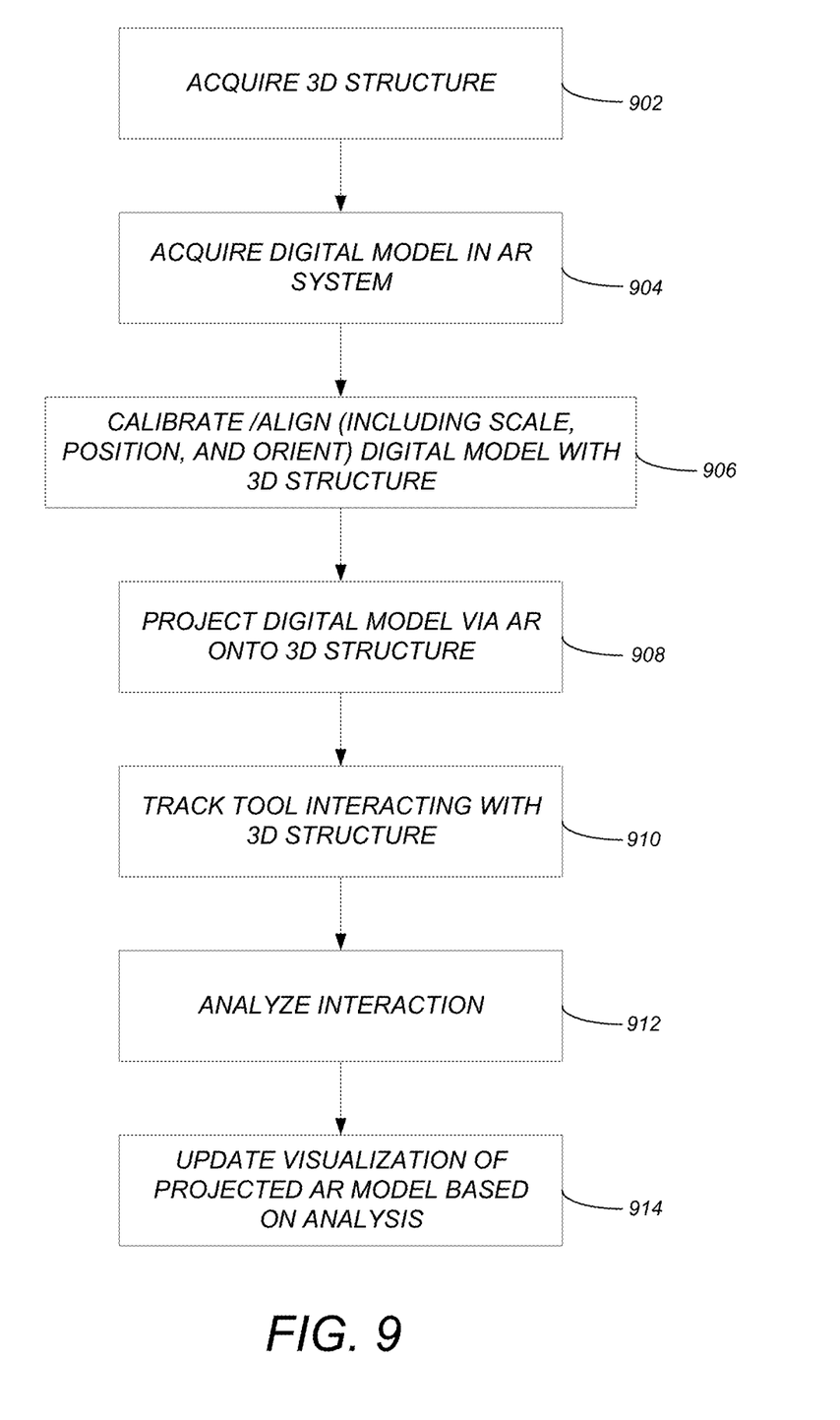
FIG. 9 illustrates the logical flow for examining a 3D structure in accordance with one or more embodiments of the invention.

FIG. 9 illustrates the logical flow for examining a 3D structure in accordance with one or more embodiments of the invention.

At step 902, the 3D structure is acquired. The 3D structure is a physical (static) 3D structure (i.e., the structure is a static structure in that it does not change over time). An example of a non-static structure is the human body.

At step 904, a digital model of the 3D structure is acquired in an augmented (AR) reality system. The digital model is an exact match to the 3D structure. In one or more embodiments, the 3D structure may be a sand mold and the digital model is the model used to generate the sand mold.

At step 906, the digital model is calibrated in the AR system to match the 3D structure. The calibrating may include scaling, positioning, and orienting the digital model coincident with the 3D structure. The calibrating may use registration points on the 3D structure to align a virtual coordinate system and the digital model with the 3D structure. In this regard, once the origin point is established, the virtual model can be aligned to the physical 3D structure. such an origin point may be identified by applying a visually distinct marker (e.g., that is perfectly aligned), or by using a separate device that has a location mark for the origin (e.g., a corner of a table/coordinate system).

At step 908, the digital model is projected, via the AR system, onto the 3D structure. The projecting may include displaying, through the AR system, a virtual version of the digital model overlaid on the 3D structure.

At step 910, a tool interacting with the 3D structure is tracked. The tool interacting with the 3D structure may include the tool cleaning the 3D structure. Alternatively, the tool may be inspecting the 3D structure for deficiencies in the 3D structure. The tracking may consist of tracking a tip of the tool interacting with the 3D structure. In one or more embodiments, the tracking may track the tool within spaces/surfaces of the 3D structure that are hidden from visibility. Tracking the tool may include the use of markers (e.g., placing a marker on the [distal] end of a probe on the tool, such as a QR code style marker), or may include sensors (e.g., that track position and orientation). Flexible tools may also be tracked such as by measuring the bend in a tool that identifies the deflection caused by the 3D structure. For example, a tool may be tracked as it is deformed within a cavity and measuring the change in resistance of a metal strip along the path can approximate curvature of the cavity (e.g., as part of the analysis step 912).

At step 912, the interaction is analyzed.

At step 914, a visualization of the projected digital model is updated based on the analysis. The updating may provide for displaying, via the AR system, a virtual representation of the tool that is positioned and aligned to match the tool. Further and/or in addition, the updating may include displaying a visualization of where the tool has interacted with the 3D structure to visually distinguish where the tool has not interacted with the 3D structure. Thus, through augmented reality (or even virtual reality), the system is able to project where the tool is in space and show where channels in the 3D structure are—and whether the tool is presently located at a junction/channel, etc. The ability to track the tool also identifies where the tool has been within the 3D structure thereby identifying what has/has not been cleaned within the 3D structure.

Based on the above, embodiments of the invention may be used to determine what areas/sections of a 3D model have/have not been cleaned so that a user spends less time going over areas that have already been cleaned. In alternative embodiments, a device may be sent down through a pipe/duct to perform an inspection/welding/repair and tracking the location of the device within the pipe/duct (which is the 3D structure) provides useful information for the task to be performed. Thus, a tool/device may be tracked within hidden spaces (e.g., behind a wall, within a mold/duct/pipe) which would require the 3D structure to be manually opened in the prior art. For example, a user may access walls of a building post construction where an electrician might need to run a cable through a wall. With the exact digital model of the constructed wall and existing substructure/foundation, the electrician could use the AR application of the invention to help guide the installation without having to open the wall.

Further, embodiments of the invention are utilized with a static 3D structure which is differentiable from the non-static environment (e.g., the medical field where the human anatomy is changing and an MRI/X-Ray image may not accurately reflect the anatomy and location of organs during a surgical procedure utilizing a surgical tool). In this regard, embodiments of the invention utilize a digital model that exactly tracks the physical 3D structure. Alternatively, or an addition, laser scanning and other capture techniques may allow for the creation of an accurate digital model of an element of the human body (e.g., a tooth). In such an example, embodiments of the invention may be utilized to track a tool operating/engaging with the human body part (e.g., a drill being used is tracked and the tooth is a static body represented by the digital model).

Hardware Environment

Figure 10:
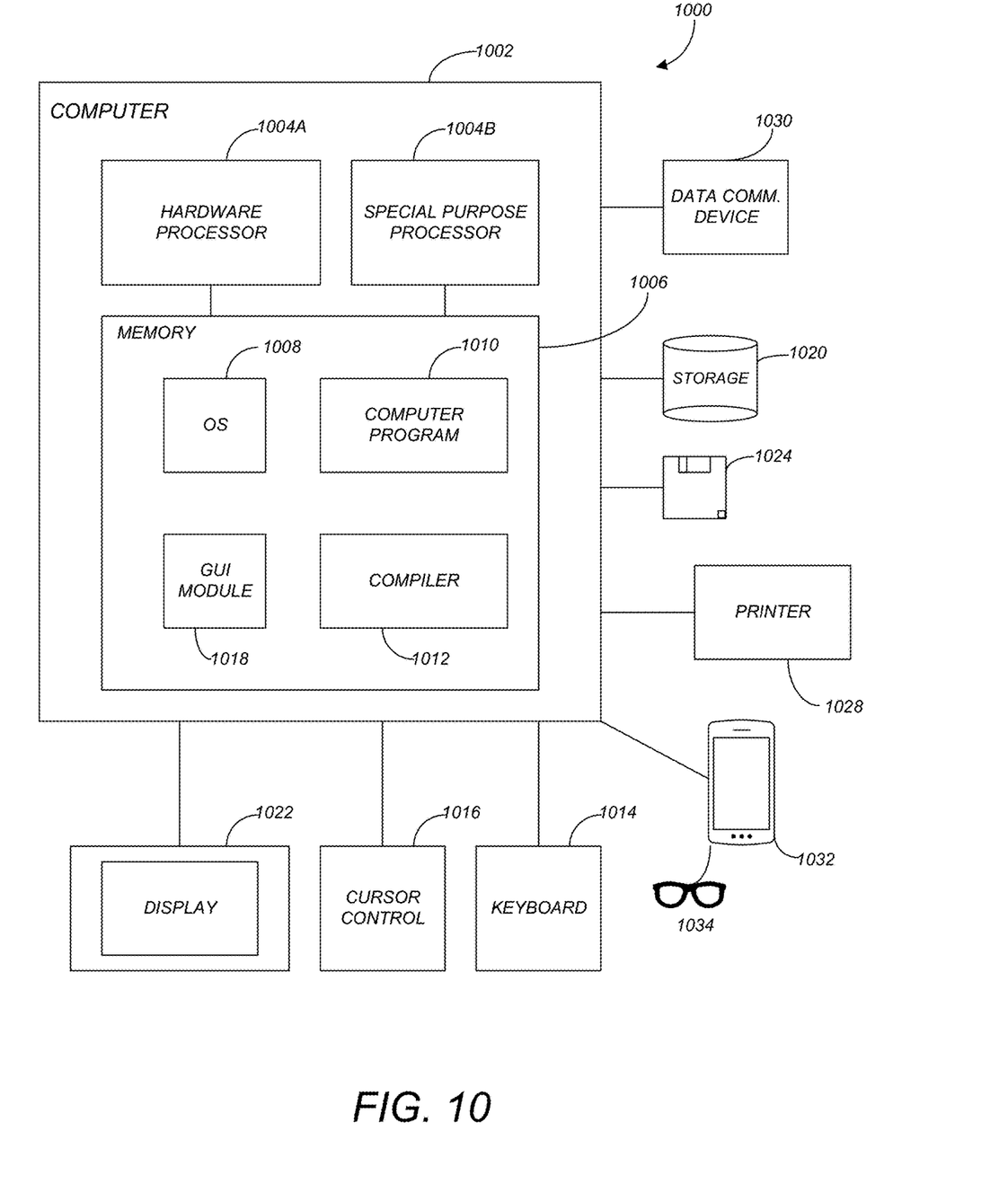
FIG. 10 is an exemplary hardware and software environment used to implement one or more embodiments of the invention.

FIG. 10 is an exemplary hardware and software environment 1000 (referred to as a computer-implemented system and/or computer-implemented method) used to implement one or more embodiments of the invention. The hardware and software environment includes a computer 1002 (e.g., an Augmented Realty [AR] computer/system) and may include peripherals. Computer 1002 may be a user/client computer, server computer, or may be a database computer. The computer 1002 comprises a hardware processor 1004A and/or a special purpose hardware processor 1004B (hereinafter alternatively collectively referred to as processor 1004) and a memory 1006, such as random access memory (RAM). The computer 1002 may be coupled to, and/or integrated with, other devices, including input/output (I/O) devices such as a keyboard 1014, a cursor control device 1016 (e.g., a mouse, a pointing device, pen and tablet, touch screen, multi-touch device, etc.) and a printer 1028 (e.g., a 3D printer that prints sand molds or molds of other material based on a digital model in memory 1006). In one or more embodiments, computer 1002 may be coupled to, or may comprise, a portable or media viewing/listening device 1032 (e.g., an MP3 player, IPOD, NOOK, portable digital video player, cellular device, personal digital assistant, augmented reality device [e.g., connected to AR goggles/glasses 1034], etc.). In yet another embodiment, the computer 1002 may comprise a multi-touch device, mobile phone, gaming system, internet enabled television, television set top box, or other internet enabled device executing on various platforms and operating systems. In this regard, the AR viewing device 1032/goggles 1034 may provide the ability to superimpose an image (i.e., a virtual/digital model) from memory 1006 over a physical 3D structure (e.g., mold 100/200A/200B/400) captured via a camera/lens of viewing device 1032/glasses 1034.

In one embodiment, the computer 1002 operates by the hardware processor 1004A performing instructions defined by the computer program 1010 (e.g., a computer-aided design [CAD] application) under control of an operating system 1008. The computer program 1010 and/or the operating system 1008 may be stored in the memory 1006 and may interface with the user and/or other devices to accept input and commands and, based on such input and commands and the instructions defined by the computer program 1010 and operating system 1008, to provide output and results.

Output/results may be presented on the display 1022 or provided to another device for presentation or further processing or action (e.g., on viewing device 1032 and/or glasses/goggles 1034). In one embodiment, the display 1022/1032/1034 comprises a liquid crystal display (LCD) having a plurality of separately addressable liquid crystals. Alternatively, the display 1022/1032/1034 may comprise a light emitting diode (LED) display having clusters of red, green and blue diodes driven together to form full-color pixels. Each liquid crystal or pixel of the display 1022/1032/1034 changes to an opaque or translucent state to form a part of the image on the display in response to the data or information generated by the processor 1004 from the application of the instructions of the computer program 1010 and/or operating system 1008 to the input and commands. The image may be provided through a graphical user interface (GUI) module 1018. Although the GUI module 1018 is depicted as a separate module, the instructions performing the GUI functions can be resident or distributed in the operating system 1008, the computer program 1010, or implemented with special purpose memory and processors.

In one or more embodiments, the display 1022/1032/1034 is integrated with/into the computer 1002 and comprises a multi-touch device having a touch sensing surface (e.g., track pod or touch screen) with the ability to recognize the presence of two or more points of contact with the surface. Examples of multi-touch devices include mobile devices (e.g., IPHONE, NEXUS S, DROID devices, etc.), tablet computers (e.g., IPAD, HP TOUCHPAD, SURFACE Devices, etc.), portable/handheld game/music/video player/console devices (e.g., IPOD TOUCH, MP3 players, NINTENDO SWITCH, PLAYSTATION PORTABLE, etc.), touch tables, and walls (e.g., where an image is projected through acrylic and/or glass, and the image is then backlit with LEDs).

Some or all of the operations performed by the computer 1002 according to the computer program 1010 instructions may be implemented in a special purpose processor 1004B. In this embodiment, some or all of the computer program 1010 instructions may be implemented via firmware instructions stored in a read only memory (ROM), a programmable read only memory (PROM) or flash memory within the special purpose processor 1004B or in memory 1006. The special purpose processor 1004B may also be hardwired through circuit design to perform some or all of the operations to implement the present invention. Further, the special purpose processor 1004B may be a hybrid processor, which includes dedicated circuitry for performing a subset of functions, and other circuits for performing more general functions such as responding to computer program 1010 instructions. In one embodiment, the special purpose processor 1004B is an application specific integrated circuit (ASIC).

The computer 1002 may also implement a compiler 1012 that allows an application or computer program 1010 written in a programming language such as C, C++, Assembly, SQL, PYTHON, PROLOG, MATLAB, RUBY, RAILS, HASKELL, or other language to be translated into processor 1004 readable code. Alternatively, the compiler 1012 may be an interpreter that executes instructions/source code directly, translates source code into an intermediate representation that is executed, or that executes stored precompiled code. Such source code may be written in a variety of programming languages such as JAVA, JAVASCRIPT, PERL, BASIC, etc. After completion, the application or computer program 1010 accesses and manipulates data accepted from I/O devices and stored in the memory 1006 of the computer 1002 using the relationships and logic that were generated using the compiler 1012.

The computer 1002 also optionally comprises an external communication device such as a modem, satellite link, Ethernet card, or other device for accepting input from, and providing output to, other computers 1002.

In one embodiment, instructions implementing the operating system 1008, the computer program 1010, and the compiler 1012 are tangibly embodied in a non-transitory computer-readable medium, e.g., data storage device 1020, which could include one or more fixed or removable data storage devices, such as a zip drive, floppy disc drive 1024, hard drive, CD-ROM drive, tape drive, etc. Further, the operating system 1008 and the computer program 1010 are comprised of computer program 1010 instructions which, when accessed, read and executed by the computer 1002, cause the computer 1002 to perform the steps necessary to implement and/or use the present invention or to load the program of instructions into a memory 1006, thus creating a special purpose data structure causing the computer 1002 to operate as a specially programmed computer executing the method steps described herein. Computer program 1010 and/or operating instructions may also be tangibly embodied in memory 1006 and/or data communications devices 1030, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 1002.

Figure 11:
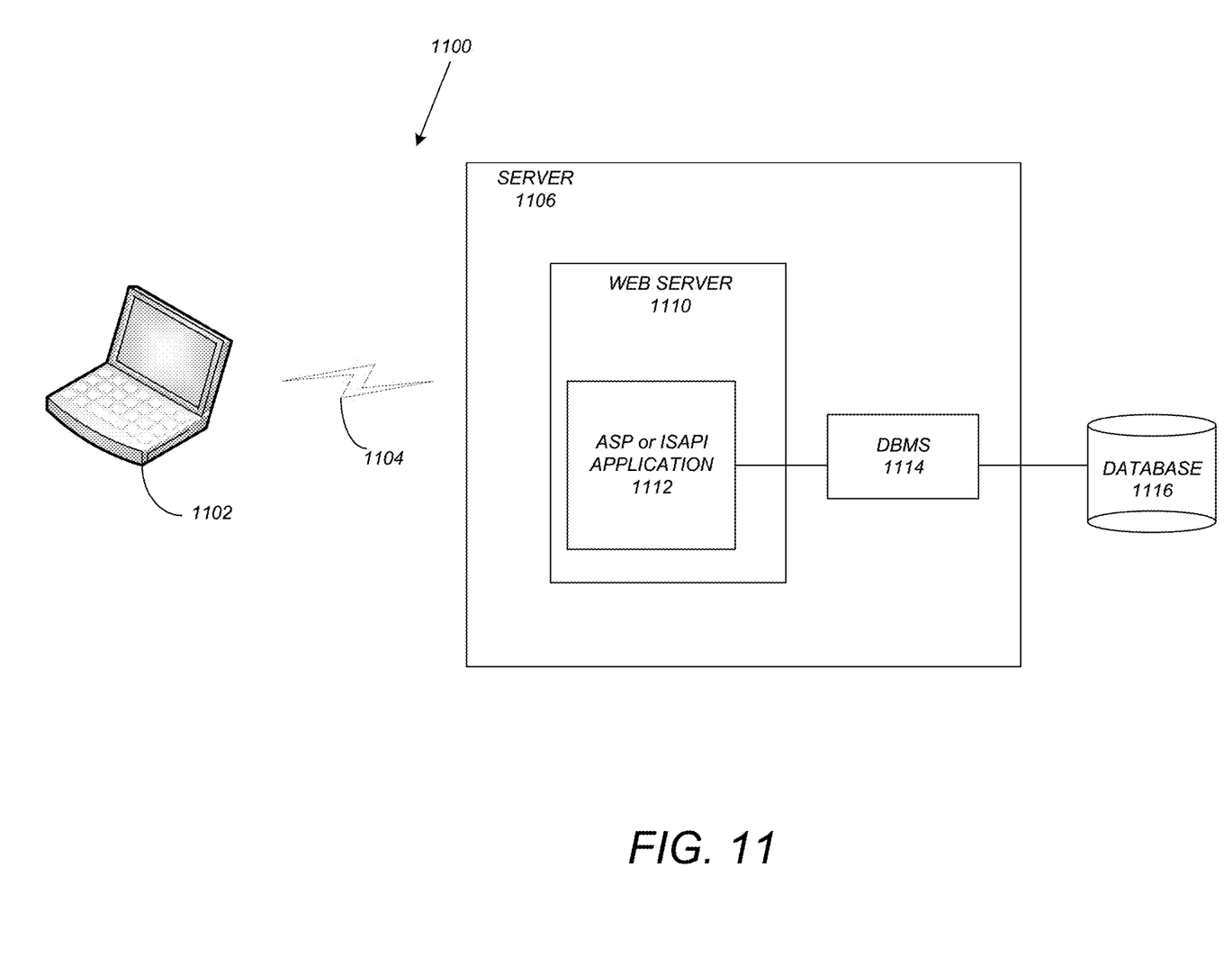
FIG. 11 schematically illustrates a typical distributed/cloud-based computer system using a network to connect client computers to server computers in accordance with one or more embodiments of the invention.

FIG. 11 schematically illustrates a typical distributed/cloud-based computer system 1100 using a network 1104 to connect client computers 1102 to server computers 1106. A typical combination of resources may include a network 1104 comprising the Internet, LANs (local area networks), WANs (wide area networks), SNA (systems network architecture) networks, or the like, clients 1102 that are personal computers or workstations (as set forth in FIG. 10), and servers 1106 that are personal computers, workstations, minicomputers, or mainframes (as set forth in FIG. 10). However, it may be noted that different networks such as a cellular network (e.g., GSM [global system for mobile communications] or otherwise), a satellite based network, or any other type of network may be used to connect clients 1102 and servers 1106 in accordance with embodiments of the invention.

A network 1104 such as the Internet connects clients 1102 to server computers 1106. Network 1104 may utilize ethernet, coaxial cable, wireless communications, radio frequency (RF), etc. to connect and provide the communication between clients 1102 and servers 1106. Further, in a cloud-based computing system, resources (e.g., storage, processors, applications, memory, infrastructure, etc.) in clients 1102 and server computers 1106 may be shared by clients 1102, server computers 1106, and users across one or more networks.

Resources may be shared by multiple users and can be dynamically reallocated per demand. In this regard, cloud computing may be referred to as a model for enabling access to a shared pool of configurable computing resources.

Clients 1102 may execute a client application or web browser and communicate with server computers 1106 executing web servers 1110. Such a web browser is typically a program such as MICROSOFT INTERNET EXPLORER/EDGE, MOZILLA FIREFOX, OPERA, APPLE SAFARI, GOOGLE CHROME, etc. Further, the software executing on clients 1102 may be downloaded from server computer 1106 to client computers 1102 and installed as a plug-in or ACTIVEX control of a web browser. Accordingly, clients 1102 may utilize ACTIVEX components/component object model (COM) or distributed COM (DCOM) components to provide a user interface on a display of client 1102. The web server 1110 is typically a program such as MICROSOFT'S INTERNET INFORMATION SERVER.

Web server 1110 may host an Active Server Page (ASP) or Internet Server Application Programming Interface (ISAPI) application 1112, which may be executing scripts. The scripts invoke objects that execute business logic (referred to as business objects). The business objects then manipulate data in database 1116 through a database management system (DBMS) 1114. Alternatively, database 1116 may be part of, or connected directly to, client 1102 instead of communicating/obtaining the information from database 1116 across network 1104. When a developer encapsulates the business functionality into objects, the system may be referred to as a component object model (COM) system. Accordingly, the scripts executing on web server 1110 (and/or application 1112) invoke COM objects that implement the business logic. Further, server 1106 may utilize MICROSOFT'S TRANSACTION SERVER (MTS) to access required data stored in database 1116 via an interface such as ADO (Active Data Objects), OLE DB (Object Linking and Embedding DataBase), or ODBC (Open DataBase Connectivity).

Generally, these components 1100-1116 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/ or data, when read, executed, and/or interpreted, results in the steps necessary to implement and/or use the present invention being performed.

Although the terms "user computer", "client computer", and/or "server computer" are referred to herein, it is understood that such computers 1102 and 1106 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 1102 and 1106. Embodiments of the invention are implemented as a software/CAD application on a client 1102 or server computer 1106. Further, as described above, the client 1102 or server computer 1106 may comprise a thin client device or a portable device that has a multi-touch-based display.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for examining a three-dimensional (3D) structure, comprising:
    acquiring the 3D structure, wherein the 3D structure is a physical 3D structure;
    acquiring, in an augmented reality (AR) system, a digital model of the 3D structure;
    calibrating the digital model in the AR system to match the 3D structure;
    projecting the digital model via the AR system onto the 3D structure;
    tracking a tool interacting with the 3D structure;
    analyzing the interaction; and
    updating a visualization of the projected digital model based on the analysis, wherein the updating comprises painting the visualization to reflect where the tool has interacted with the 3D structure to visually distinguish, in the visualization, where the tool has not interacted with the 3D structure.

2. The computer-implemented method of claim 1, wherein:
    the 3D structure comprises a sand mold; and
    the digital model was used to generate the sand mold.

3. The computer-implemented method of claim 1, wherein:
    the calibrating comprises scaling, positioning, and orienting the digital model coincident with the 3D structure.

4. The computer-implemented method of claim 1, wherein:
    the calibrating uses registration points on the 3D structure to align a virtual coordinate system and the digital model with the 3D structure.

5. The computer-implemented method of claim 1, wherein:
    the projecting comprises displaying, through the AR system, a virtual version of the digital model overlaid on the 3D structure.

6. The computer-implemented method of claim 1, wherein:
    the tool interacting with the 3D structure comprises the tool cleaning the 3D structure.

7. The computer-implemented method of claim 1, wherein:
    the tool interacting with the 3D structure comprises the tool inspecting the 3D structure for deficiencies in the 3D structure.

8. The computer-implemented method of claim 1, wherein:
    the tracking the tool comprises tracking a tip of the tool interacting with the 3D structure.

9. The computer-implemented method of claim 1, wherein:
    the tracking the tool tracks the tool within spaces of the 3D structure that are hidden from visibility.

10. The computer-implemented method of claim 1, wherein:
    the updating comprises displaying, via the AR system, a virtual representation of the tool that is positioned and aligned to match the tool.

11. The computer-implemented method of claim 1, wherein:
    the updating comprises displaying a visualization of where the tool has interacted with the 3D structure to visually distinguish where the tool has not interacted with the 3D structure.

12. An augmented reality (AR) system for examining a three-dimensional (3D) structure, comprising:
    (a) an AR computer having a memory;
    (b) a processor executing on the AR computer; and
    (c) the memory storing a set of instructions, wherein the set of instructions, when executed by the processor cause the processor to perform operations comprising:
        (i) acquiring a digital model of the 3D structure;
        (ii) calibrating the digital model to match the 3D structure, wherein the 3D structure is a physical 3D structure;
        (iii) projecting the digital model onto the 3D structure;
        (iv) tracking a tool interacting with the 3D structure;
        (v) analyzing the interaction; and
        (vi) updating a visualization of the projected digital model based on the analysis, wherein the updating comprises painting the visualization to reflect where the tool has interacted with the 3D structure to visually distinguish, in the visualization, where the tool has not interacted with the 3D structure.

13. The AR system of claim 12, wherein:
    the 3D structure comprises a sand mold; and
    the digital model was used to generate the sand mold.

14. The AR system of claim 12, wherein:
    the calibrating comprises scaling, positioning, and orienting the digital model coincident with the 3D structure.

15. The AR system of claim 12, wherein:
    the calibrating uses registration points on the 3D structure to align a virtual coordinate system and the digital model with the 3D structure.

16. The AR system of claim 12, wherein:
    the projecting comprises displaying a virtual version of the digital model overlaid on the 3D structure.

17. The AR system of claim 12, wherein:
the tool interacting with the 3D structure comprises the tool cleaning the 3D structure.
18. The AR system of claim 12, wherein:
the tool interacting with the 3D structure comprises the tool inspecting the 3D structure for deficiencies in the 3D structure.
19. The AR system of claim 12, wherein:
the tracking the tool comprises tracking a tip of the tool interacting with the 3D structure.
20. The AR system of claim 12, wherein:
the tracking the tool tracks the tool within spaces of the 3D structure that are hidden from visibility.
21. The AR system of claim 12, wherein:
the updating comprises displaying a virtual representation of the tool that is positioned and aligned to match the tool.
22. The AR system of claim 12, wherein:
the updating comprises displaying a visualization of where the tool has interacted with the 3D structure to visually distinguish where the tool has not interacted with the 3D structure.

\* \* \* \* \*